Dec. 11, 1928.

J. I. HAASE 1,694,876

MACHINE FOR MANUFACTURING SOLID TIRES

Filed Oct. 29, 1925  4 Sheets-Sheet 1

Inventor
Jorgen I. Haase,
By
A. S. Trogner
Attorney

Dec. 11, 1928.

J. I. HAASE 1,694,876

MACHINE FOR MANUFACTURING SOLID TIRES

Filed Oct. 29, 1925 4 Sheets-Sheet 2

INVENTOR
Jorgen I. Haase,
BY
ATTORNEY

Dec. 11, 1928.
J. I. HAASE
1,694,876
MACHINE FOR MANUFACTURING SOLID TIRES
Filed Oct. 29, 1925    4 Sheets-Sheet 4
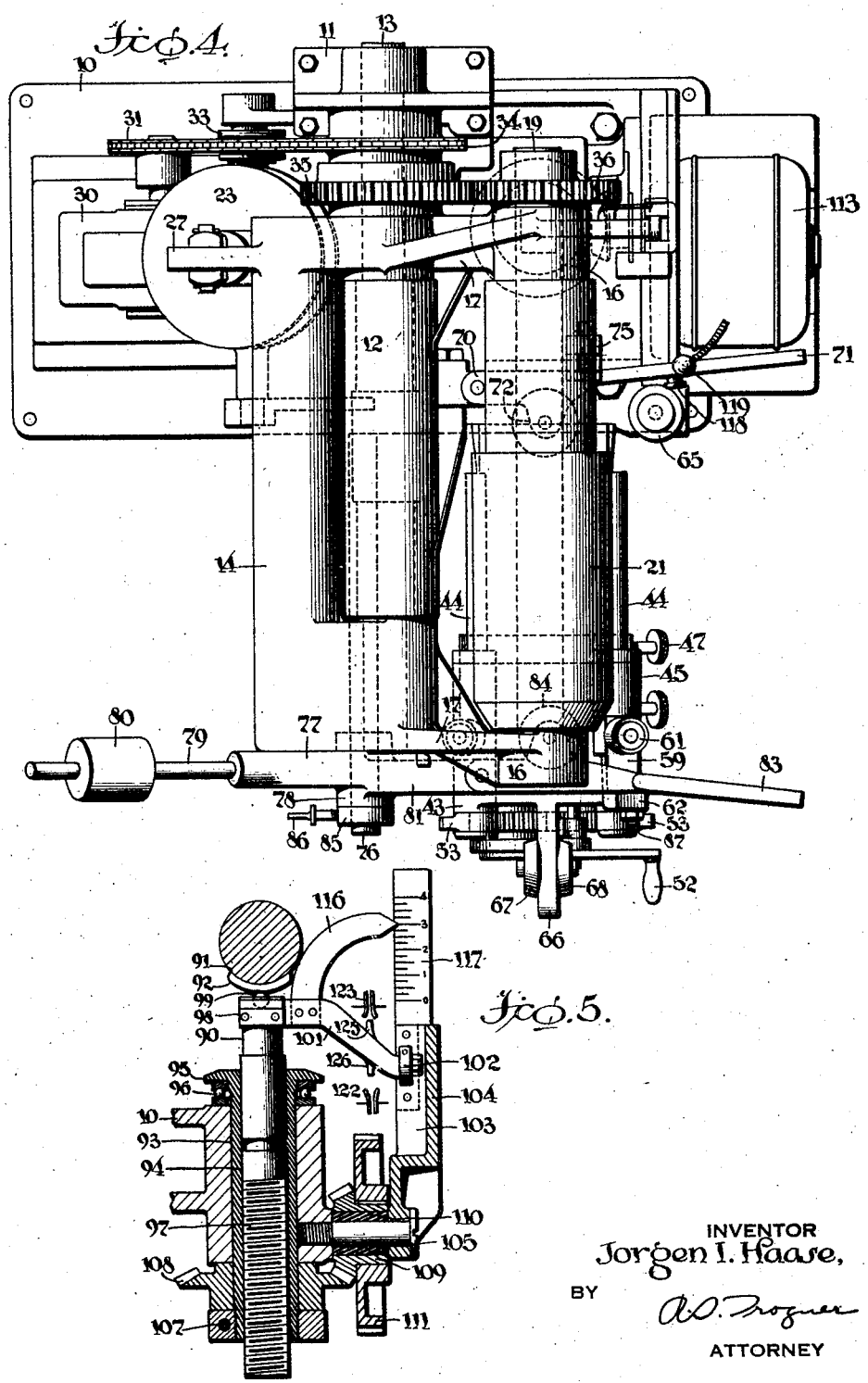
INVENTOR
Jorgen I. Haase,
BY
ATTORNEY Patented Dec. 11, 1928.

1,694,876

UNITED STATES PATENT OFFICE.

JORGEN I. HAASE, OF AKRON, OHIO, ASSIGNOR TO THE GOODYEAR TIRE & RUBBER COMPANY, OF AKRON, OHIO, A CORPORATION OF OHIO.

MACHINE FOR MANUFACTURING SOLID TIRES.

Application filed October 29, 1925. Serial No. 65,576.

My invention relates to the art of manufacturing resilient tires, and, more particularly, it pertains to a method of and a machine for manufacturing solid or cushion rubber tires of the type wherein a resilient tread section is secured firmly to a metallic rim.

Heretofore, solid rubber tires have been manufactured by producing a straight section of tread material of appropriate length, cutting the ends thereof at an angle, and overlapping and cementing the ends to form a continuous tread. The tread was then forced laterally over a metallic rim, the periphery of which had been covered previously with a thin layer of unvulcanized hard rubber, which forms, upon vulcanization of the tire, a union between the rim and the tread. When the tread was thus positioned over the rim, it was necessary to hammer the side walls thereof in order to force them between the upstanding flanges of the rim. This method of building tires, which includes the successive steps of splicing the tread section, coating the rim, applying the tread to the rim, and stitching it into place, is open to many objections. If the initial length of the tread section is not exactly correct, the spliced band accordingly does not fit properly on the rim. The combined efforts of several men are required to apply the tread to the rim, and the operation is, at best, slow and laborious. The necessarily vigorous efforts imposed upon the tread, in practicing the old method, often causes the tread ends to separate, and also causes a displacement of the side walls of the tread along one portion of the flange, as another is forced into place.

It is among the objects of the present invention to provide an improved method of manufacturing solid tires, wherein the necessary operations are performed in a manner which avoids the difficulties previously experienced.

It is also an object of the invention to provide a solid tire building machine which may be utilized to perform the operations necessary to the proper assembly of a solid tire.

Various other objects pertaining to improvements in the art of manufacturing resilient tires, subordinate to the broad objectives set forth above, will become apparent from a perusal of the following description of a machine with which the invention may be practiced.

For the purposes of illustrating the principles of the invention, a preferred embodiment of the machine is shown in the accompanying drawings, wherein:

Fig. 4 is a plan view thereof; and

Fig. 5 is a detailed cross-sectional view of a portion of the pressure control mechanism.

Figure 1:
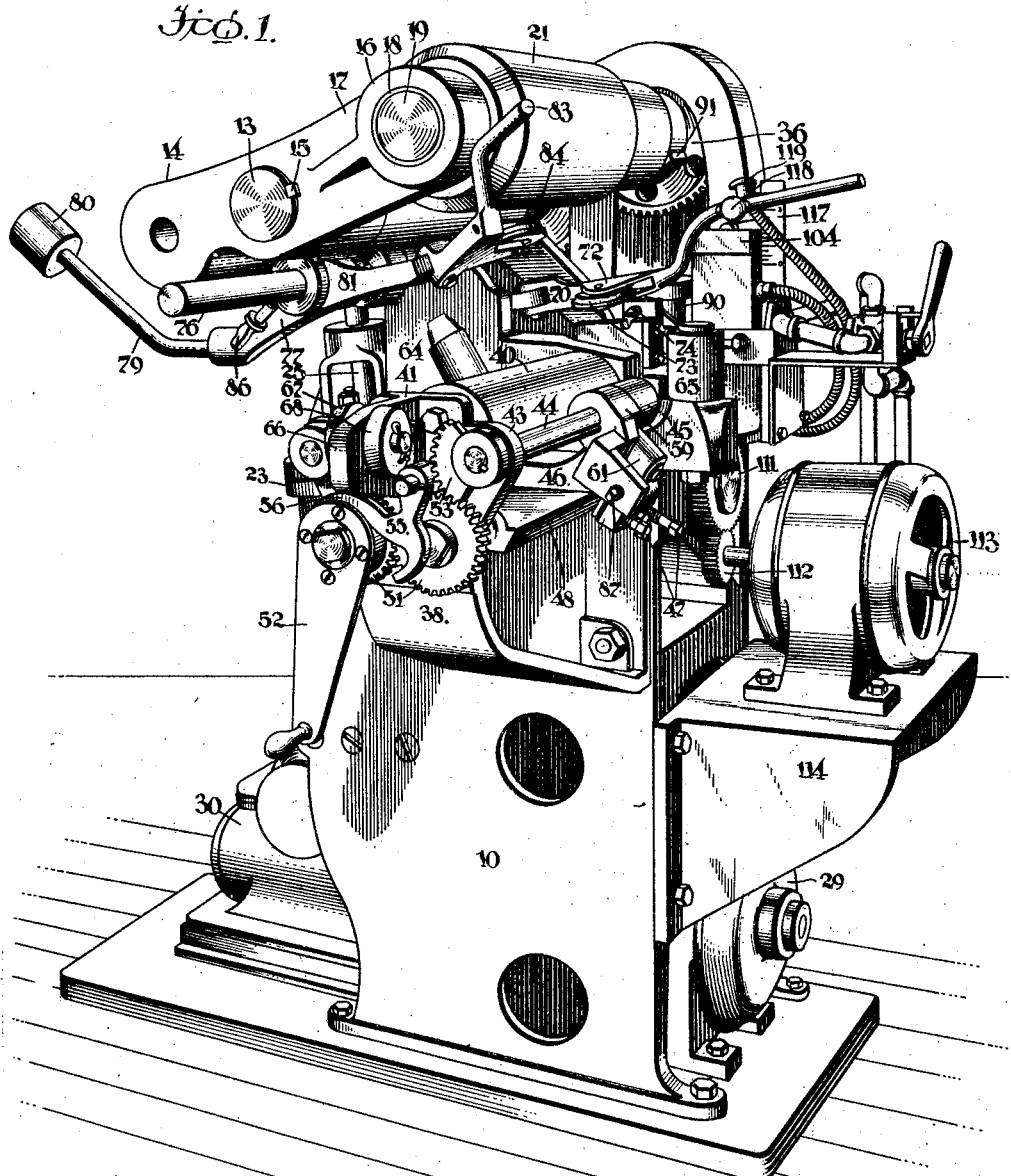
Fig. 1 is a perspective view of the machine.

The machine comprises a main frame 10, on which is mounted a plurality of bearing housings 11 and 12, having journaled therein a shaft 13 which supports a pressure roller yoke 14 suitably keyed thereto, as indicated at 15. Bosses 16 are formed at the ends of the arms 17 of the yoke, and are pierced to receive bearing bushings 18 adapted to support a shaft 19. A pressure roller 21 is mounted upon the shaft 19, for a purpose which will be explained presently. A limited arcuate movement is imparted to the yoke 14, by means of the force exerted in a fluid pressure cylinder 23, pivotally mounted on the frame 10, as indicated at 24. A piston rod 25 extending into the cylinder 23 is pivotally connected, as indicated at 26, to a lug 27 formed on the yoke 14, and, as the piston of the cylinder 23 is actuated by means of a suitable fluid, such as compressed air, the roller 21 is caused to be correspondingly raised or lowered.

Rotational motion of the roller 21 with the shaft 19 is obtained through a suitable driving mechanism, comprising a motor 29 which is connected to a speed reducing unit 30, of any desired type. A chain or link belt 31 extends over suitable idlers 32 and 33, from the unit 30 to a sprocket wheel 34, which is loosely mounted on the shaft 13 between the bearings 11 and 12. A gear 35, also loosely mounted upon the shaft 13, but rigidly connected to the sprocket wheel 34, meshes with a gear 36 keyed to the shaft 19. There is thus provided a positive drive which insures rotation of the roller 21 upon operation of the motor 29.

The frame 10 is provided with a bracket 38 having at its outer end a bearing housing 39 which is in alignment with a bearing housing (not shown), positioned in the frame adjacent the inner end of the bracket. An idle roller 40, provided with suitable journals which extend into the bearing housing 39 and its associate, is so positioned over the bracket 38 as to be in alignment with the roller 21 when the yoke 14 is moved downwardly. A post 41 is secured to the end of the bracket 38, and provides a mounting for mechanism by means of which a rim may be properly positioned upon the roller 40. Two arms 43 on the post 41 are pierced to provide journals for rotatable rods 44, the inner portions of which are supported in bearings 45 provided in a bridge 46, secured, by means of screws 47, to ledges 48 formed on either side of the bracket 38. The bridge is disposed beneath the roller 40 with sufficient clearance to permit the proper rotation thereof.

Two intermeshing gears 51 are mounted on the lower portion of the post 41, and to one of them is keyed an operating handle 52. Each gear 51 also meshes with a segmental gear 53 which is keyed to the rotatable rod 44. A latch 55 is pivoted on the post 41, and has an arm 56 of resilient steel which surrounds one of the gears 51 with sufficient force to hold the gears 51 and 53, and the rods 44, in any desired position. The latch 55 does not exert sufficient force, however, to prevent the machine operator from readily rotating the handle 52.

Figure 2:
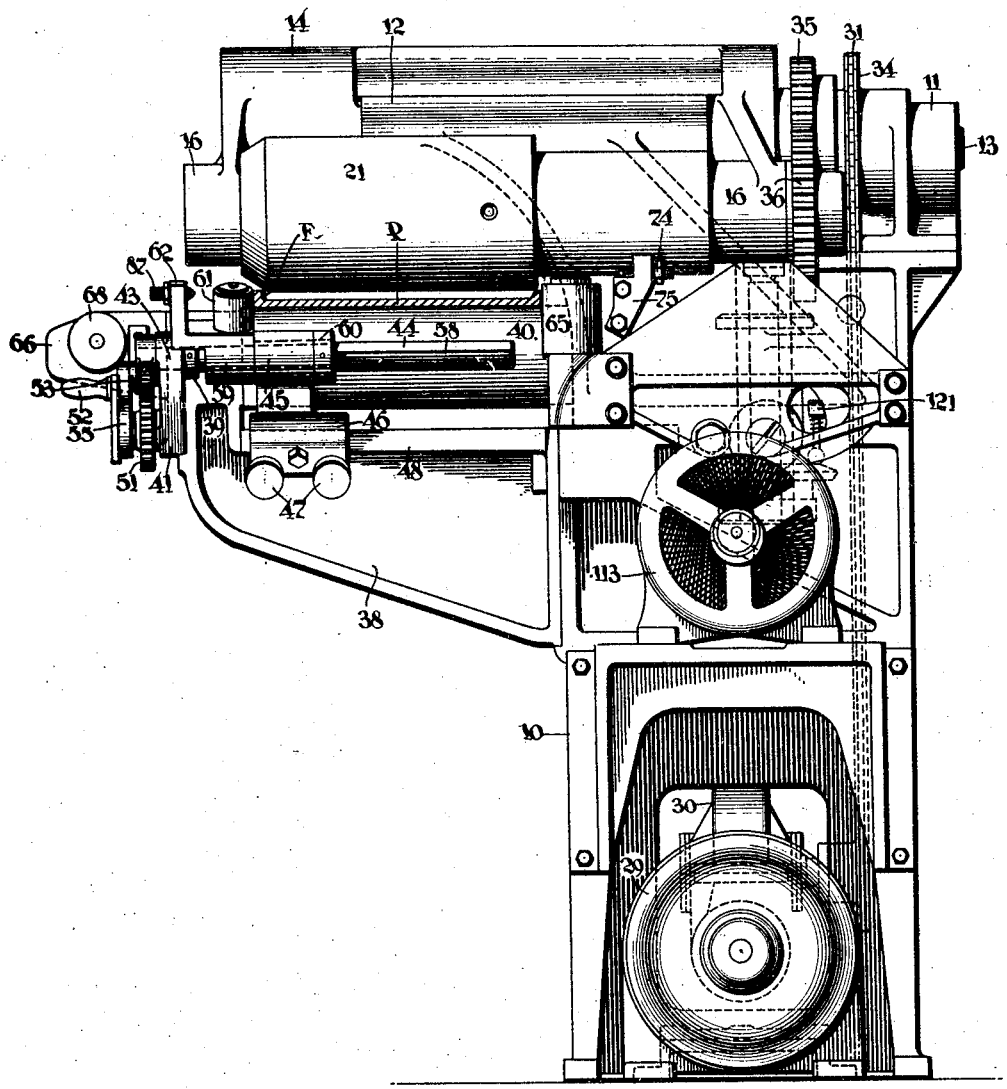
Fig. 2 is a front elevational view, portions of the stitching mechanism being removed for the sake of clearness.
Figure 3:
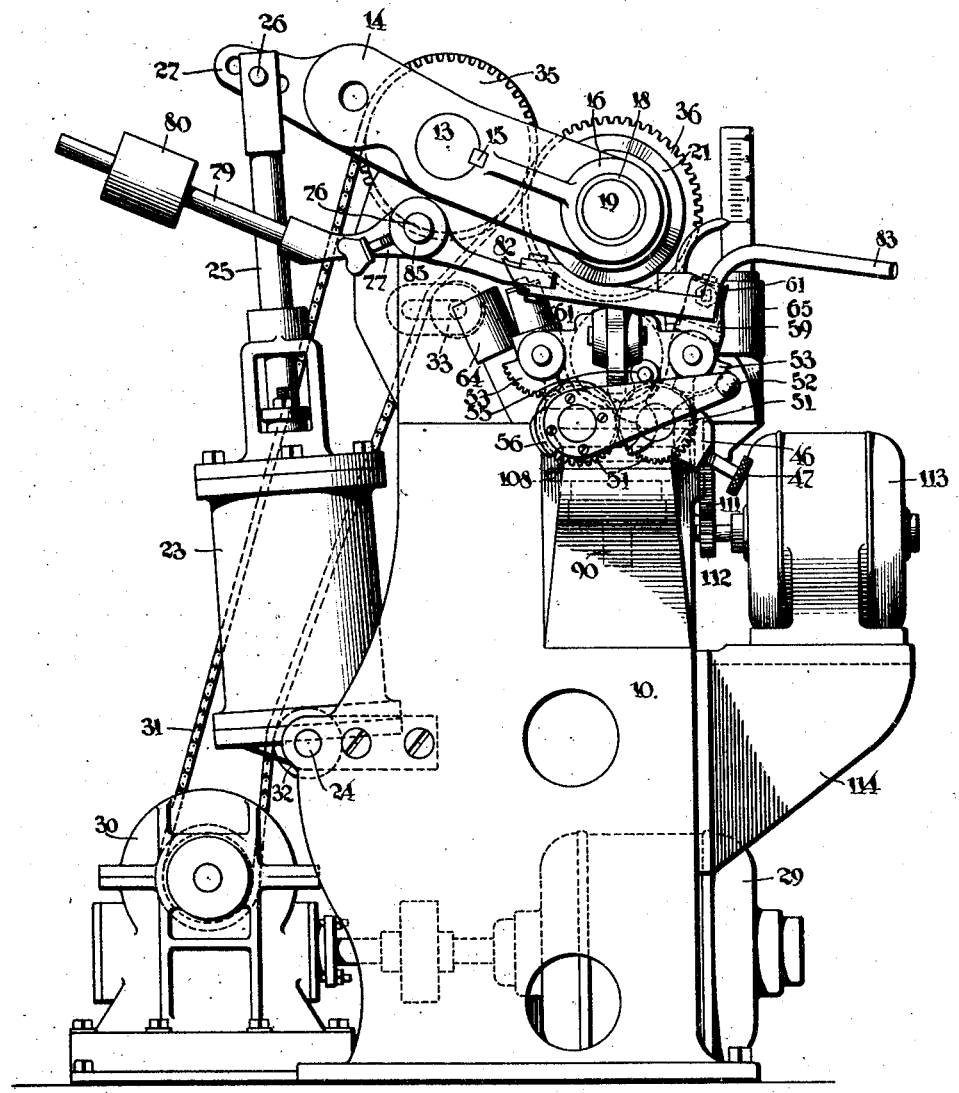
Fig. 3 is a side elevational view of the machine.

Each rod 44 is provided with a key 58 which engages a keyway formed in a block 59 mounted upon the rod for sliding movement only, and which is provided with a bushing 60 extending into the bearing 45. Each block 59 has mounted thereon a guide roller 61, and on the block positioned on the front side of the machine, as shown in Fig. 2, there is also provided an upstanding lug 62 which is adapted to cooperate with the stitching mechanism, to be explained presently. Two additional guide rollers 64 and 65 are mounted in the frame 10 adjacent the inner end of the bracket 38, and they are substantially in respective alignment with the rollers 61. As an adjunct to the parts assembled on the post 41, there is also provided a boss 66 to which are fastened two rollers 67 and 68, which may be utilized when a rim or assembled tire is moved on or off the roller 40.

From the construction as described thus far, it is apparent that a metal rim R positioned over the roller 40, may be properly aligned with a straight length of tread material, by adjusting the rollers 61 along the rods 44 to the proper distance from the rollers 64 and 65, and then rotating the lever 52 to cause the rollers 61 to contact with the side of the rim. A machine of this type may be employed for certain operations, such as, for example, the assembly of straight tread sections to flat, or unflanged rims. When the rim is provided with upstanding flanges, as usually is the case, it is desirable to have stitching mechanism associated with the above described parts, in order to force the side walls of the tread material between the flanges of the rim.

To accomplish this end, a pivot 70 provided on the frame 10 has secured thereto a handle 71 having extensible portions 72 between which is rotatably mounted a beveled stitching wheel 73. An adjustable pin, such as a screw threaded member 74, is mounted in a lug 75 secured to the frame and is adapted to engage the stitching handle when it is brought into operating position. The pin 74 and lug 75 form a lock which holds the stitching wheel 73 firmly against the tread section adjacent the flange of the rim, and thus obviates the necessity of the operator's manual control.

A stitching device adapted to engage the opposite face of the tread is mounted on a fixed rod 76 secured to the main frame 10 at the rear of the bracket 38. The device comprises a lever 77, pivotally mounted on the rod as indicated at 78, having an arm 79 upon which is secured a counter-weight member 80. The other arm 81 of the lever 77 has a shank 82 at its end on which is pivoted a stitching handle 83 having a stitching roller 84 mounted thereon. The lever 77 may be positioned on the rod 76 by means of a collar 85 which is secured thereto by any suitable means, such as a wing nut 86. A pin 87, adjustably secured in the lug 62 formed on the block 59, is adapted to engage the handle 83 and thus form a lock for the stitching wheel 84 which operates in a manner similar to the lock provided for in the stitching wheel 73.

To facilitate the operation of securing or splicing the ends of the tread sections and for additional reasons which will become apparent from a description of the operation of the machine, it is desirable to include a system by means of which the pressure exerted by the roller 21 may be controlled. One method whereby this effect could be obtained would be to provide means to vary the pressure within the cylinder 23 and hence the force exerted by the roller 21. However, in the preferred embodiment described herein, means are provided to limit the downward movement of the yoke 14 while allowing the pressure exerted from the piston in the cylinder 23 to remain at a substantially constant value. By limiting the movement of the roller 21, the degree of compression to which the tread is subjected may be made any reasonable value. In other words, the system operates to convert a substantially constant pressure within the cylinder to a fractional effective pressure upon the rim.

The pressure control means shown schematically in Figs. 2 and 4, and in detail in Fig. 5, comprises an adjustable stem 90 against which a shoe 91, provided with an arcuate bearing face 92 and secured to the underside of the boss 16, rests when the yoke 14 is in its lowermost position. A portion of the frame 10 is provided with an aperture 93 in which is positioned an internally threaded sleeve 94, projecting beyond the aperture 93, and provided at one end with a collar 95. A suitable bearing, such as a thrust ball bearing 96, is positioned between the frame 10 and the collar 95 and provides an efficient means for rotatably supporting the sleeve 94. The stem 90 has a threaded portion 97, which engages the threads of the sleeve 94. The upper end of the stem is provided with a cap 98 in which is mounted a roller 99 adapted to contact with the bearing face 92 of the shoe 91. The antifrictional contact thus provided between the shoe and the stem is desirable, inasmuch as the parts move over each other, due to the slight angularity which is imparted to the boss 16 by virtue of the pivoted suspension of the yoke 40.

A guide arm 101, secured to the cap 98, has mounted on its outer end an anti-friction bearing 102 which is constrained to rotate between side walls 103 on a guide 104, secured to the frame 10 by means of a screw 105. The lower end of the sleeve 94 has secured thereto, by means of a nut 107, a beveled gear 108 which meshes with a beveled gear 109 loosely mounted on a bushing 110 surrounding the screw 105. A gear 111 keyed to the hub of the beveled gear 109, engages a pinion 112 secured to the shaft of a motor 113. As best shown in Fig. 1, the motor is mounted on a shelf 114 secured to the frame 10, in order to reduce the space occupied by the driving mechanism. Actuation of the train of gears described above causes rotation of the threaded sleeve 94 and inasmuch as the stem 90 can not rotate by virtue of the engagement of the arm 101 with the guide 104, it is caused to be raised or lowered, depending upon the direction in which the motor 113 revolves. The position of the stem 90 within the sleeve 94 is determined by a pointer 116 secured to the cap 98, which slides over a scale 117 secured to the guide 104 and which is suitably graduated to indicate the distance between the roller 21 and the roller 40.

The energization of the electric motor 113 is controlled by two switches 118 and 119, preferably of the push button type, which are mounted on the stitching handle 71 for the sake of convenience, and which are so connected to a source of electrical energy as to cause the motor 113 to rotate in either direction. A brake, indicated at 121 in Fig. 2, which may be operated automatically by breaking the circuit, is provided for the mechanism leading from the motor 113, to prevent the stem 90 from moving beyond the desired point and thus making adjustment thereof a simple operation. As an additional precaution, switches, indicated schematically at 123 and 124 in Fig. 5, actuated by plugs 125 and 126, secured to the guide arm 101, are provided in the circuit to prevent the motor 113 from driving the stem 90 beyond the extreme operating positions. Inasmuch as the details of an electric circuit adapted to operate the machine in the manner described above are well-known, it is deemed unnecessary to introduce a fuller description thereof.

In assembling a tire tread on a rim, the operator positions the rollers 61 a distance from the rollers 64 and 65 equal to the width of the rim, by moving the bridge 46 along the bracket 38. Air is admitted to the upper side of the cylinder 23 to raise the pressure roller 21 from the roller 40. With the rollers 61 rotated to their lower position, a steel rim R having upstanding flanges F, indicated in cross-section in Fig. 1, the periphery of which has been coated with unvulcanized hard rubber, is placed over the roller 40, an operation which is facilitated by the antifrictional support obtained from the rollers 67 and 68. When the rim has been pushed along the roller 40 until a flange thereof contacts with the rollers 64 and 65, the handle 52 is revolved to bring the rollers 61 in contact with the other flange. The rim is then in proper position, being supported by the roller 40 and constrained to move in a predetermined path by the guide rollers 61, 64 and 65. A straight length, or section, of solid tread stock, the ends of which are skived at an angle in order to provide a lap joint, is then brought up to the machine by suitable means, such as, for example, a roller conveyor. The end of the tread is secured to the rim between the flanges by means of the natural adhesion of the surfaces, or it may be secured by a coating of rubber cement. The rim with the attached tread is then rotated over the roller 40 until the maximum thickness of the tread is below the roller 21.

Compressed air applied to the under side of the piston in the cylinder 23 causes the yoke 14 to rotate downwardly until the shoe 91 is in contact with the roller 99, thus forcing the roller 21 against the tread by a predetermined pressure. The stitching handles 71 and 83 are swung inwardly until the stitching wheels 73 and 84 are in contact with the side walls of the tread adjacent the flanges of the rim, and they are then locked in position by forcing them within the lugs 75 and 62. The motor 29 is then started, causing rotation of the rollers 21 and 40 and the rim R. As the rim revolves, the tread section is constrained to follow by virtue of the pressure exerted thereon, and as each portion of the tread comes under the roller, it is firmly impressed upon the rim. At the same time the side walls of the tread are forced between the flanges of the rim.

If, during the application of the tread, the operator observes that the section is too short to fit completely around the rim and form a good joint, he may increase the compression exerted by the roller 21 by manipulation of the controlling buttons 118 and 119. This causes the tread section to become somewhat elongated due to the flow of the plastic rubber away from the zone of compression. Conversely, if the tread section is too long, the pressure may be relieved sufficiently to obtain the proper length for a good lap at the ends. Additional pressure, if required, may be imparted to the side walls of the tread adjacent the flanges by turning the adjustable pins inwardly or by manual pressure exerted through the handles 73 and 83.

After the tire has made a complete revolution and the tread has been properly applied and stitched to the rim, pressure on the roller 21 is released by reversing the flow of fluid within the cylinder 23, and a steel plate, having a curvature corresponding substantially to that of the rim, is placed on the tread over the joint. The operator manipulates the control buttons 118 and 119, to raise the stem 90 a distance corresponding to the thickness of the plate, to impart through the roller 21 substantially the same pressure to the tread as that previously exerted. The purpose of the plate is to distribute the pressure so that a substantially uniform force is exerted over each unit area of the joint, and to prevent the roller 21 from sinking into the plastic material of which the tread is composed. The roller 21 is then lowered and pressure is exerted over the joint for a sufficient length of time to secure firmly the ends of the tread section. When this operation is completed, the roller 21 is raised, the rollers 61 are moved downwardly, and the assembled tire is removed from the roller 40 for further processing, such as vulcanization.

It will be apparent from the foregoing description that an improved method is provided for the manufacture of solid tires and that there is also provided a machine by which the method may be practiced efficiently. Instead of forming a continuous tread of uncertain length, laboriously forcing it over a rim, and then hammering the side walls between the flanges, the tread is applied from a straight unitary length around the periphery of the rim, and, at the same time, the side walls are positioned between the flanges. The joint is formed after the tread has been applied to the base band and thus the necessity for securing the ends a second time in a large number of cases is avoided. The difficulties experienced with tight or loose fittings between the tread and the rim due to errors in cutting the length of tread material are also overcome by employing means to change the length of the tread as it is applied to the rim to effect a more perfect joint between the meeting ends.

The machine adapted to practice the method may be employed to perform all of the operations necessary to the proper assembly of a solid tire with a marked saving in time and labor. In this respect, it is believed that the invention is of a pioneer character, inasmuch as a solid tire building machine adapted to perform all necessary operations has not, to the best of my knowledge, been made before. It will be apparent to those skilled in the art that the principles of the invention may be practiced by other means than those described herein and that the utility of the machine is not limited to the specific operations described above. It is intended, therefore, that the invention should be limited only by the scope of the following claims.

What I claim is:

1. A solid tire building machine comprising a frame having a rim supporting member rotatably mounted thereon, a rotatable rod having a guide roller secured thereto mounted adjacent the member, and means to rotate the rod and thereby the guide roller.

2. A solid tire building machine comprising a frame having a bracket extending from the side thereof, a rim supporting roller rotatably mounted over the bracket, a rotatable rod having a guide roller secured thereto mounted on the bracket, and means positioned on the bracket to rotate the rod and thereby the guide roller.

3. A solid tire building machine comprising a frame having a bracket extending therefrom, a rim supporting roller journaled in the bracket, a bearing housing disposed between the roller and the bracket and having journaled therein rotatable rods, guide rollers keyed to the rods, mechanism adapted to rotate the rolls positioned in the bracket, and means adapted to hold the rods in any desired position.

4. A solid tire building machine comprising a frame having a shaft mounted thereon, a pressure roller supporting yoke pivotally mounted upon the shaft, means pivotally connected to the yoke to cause limited rotational movement thereof, a pressure roller supporting shaft journaled in the yoke, and means connected to the pressure roller shaft to impart positive rotation thereto.

5. A solid tire building machine comprising means to position a section of tread material upon the base of a flanged rim, means to force the side walls of the tread material between the flanges of the rim, and means to secure the forcing means in position.

6. In combination with a tire building machine, a device adapted to exert pressure against the side wall of a section of tread material, and means adapted to lock the device in operative position.

7. In combination with a machine adapted to position a straight section of tread material upon a flanged rim, a device for forcing the side wall of the tread material within the flange of the rim comprising a lever having a counterweight member secured to one arm thereof, a rotatable wheel pivotally mounted upon the other arm and means for securing the lever in operative position.

8. A solid tire building machine comprising a frame having a roller adapted to receive a flanged rim rotatably mounted thereon, means for positioning the rim on the roller, means to apply a straight section of tread material to the periphery of the rim, means disposed adjacent the rim positioning means adapted to force the side walls of the tread material between the flanges of the rim and means for locking the forcing means in operative position.

9. A solid tire building machine comprising a frame having a roller adapted to receive a flanged rim mounted thereon, guide rollers adjustably mounted on the frame and adapted to position the rim, means to apply a straight section of tread material to the periphery of the rim, pivotally mounted members mounted upon the frame and provided with means to force the side walls of the tread material between the flanges of the rim, and means to lock the pivotally mounted members in operative position.

10. A solid tire building machine comprising means to support a rim, means to position a straight section of tread material upon the periphery thereof, means to exert pressure upon the tread, and adjustable means engageable by a portion of the pressure exerting means to maintain the pressure at a predetermined value.

11. A solid tire building machine comprising means to support a rim, means to position a straight section of tread material upon the periphery thereof, means to exert pressure upon the tread material as it is applied to the rim, and adjustable means opposed to the pressure exerting means to maintain the effective pressure upon the tread material constant.

12. A solid tire building machine comprising a roller supported in a pivotally mounted member adapted to exert a pressure upon a section of tread material, and a pressure controlling device including an adjustable member adapted to limit the downward movement of the pressure roller.

13. A solid tire building machine comprising means for supporting a rim, means for exerting pressure upon the meeting ends of a tread applied to the rim, and adjustable stop means for engagement by the pressure exerting means to vary the pressure.

14. In a solid tire building machine having means to exert a pressure upon the meeting ends of a tread supported upon the machine, a pressure control device comprising a member movable within the frame of the machine, means to move the member with respect to the pressure exerting means and means to limit the displacement of the movable member.

15. In a solid tire building machine having means to exert a pressure upon a tread supported by the machine, a pressure control device comprising a movable member supported in the frame of the machine, actuating means for the movable member and means to prevent displacement of the movable member when the actuating means are disengaged.

16. In a solid tire building machine having means adapted to exert a pressure upon the tread of a solid tire, a pressure control device comprising a movable member positioned in the frame of the machine, actuating means for the movable member, means limiting the displacement of the movable member, and means to prevent movement of the member when the actuating means are disengaged therefrom.

17. In a machine for building solid tires having means adapted to exert pressure upon a tread, a pressure control device comprising an internally threaded sleeve rotatably mounted in the frame of the machine, a threaded stem positioned within the sleeve, means to rotate the sleeve and a guide secured to the stem and preventing rotational movement thereof, whereby the stem will be given a translational motion as the sleeve is rotated.

18. In a machine for building solid tires having means adapted to exert pressure upon a tread, a pressure control device comprising a sleeve mounted in the frame of the machine, a stem movable within the sleeve, a source of electrical energy adapted to actuate the stem through a mechanical train, and circuit breaking means positioned on the stem and operative after a predetermined displacement of the stem.

19. In a machine for building solid tires having means adapted to exert pressure upon a tread, a pressure control device comprising a sleeve mounted in the frame of the machine, a stem movable within the sleeve, a source of electrical energy adapted to actuate the stem through a mechanical train, circuit breaking means positioned on the stem and operative after a predetermined displacement thereof, and means operative upon the opening of the circuit to prevent further displacement of the stem.

20. A solid tire building machine comprising a frame having a yoke pivotally mounted thereon, a pressure roller rotatably mounted in the yoke, means for moving the yoke downwardly, and means limiting the movement of the yoke comprising an arcuate member mounted on the roller, an adjustable stem mounted in the frame, and a member positioned in the stem and adapted to contract with the arcuate member.

21. A solid tire building machine comprising a frame having a supporting roller rotatably mounted thereon, a pressure roller supported on a pivotally mounted member and adapted to be moved toward the supporting roller, means for positioning a flanged rim on the supporting roller, means to force the pressure roller against a section of tread material positioned upon the rim, means to rotate the pressure roller and to apply the tread material to the periphery of the rim, means to force the side walls of the tread material between the flanges of the rim, and adjustable means to control the pressure exerted against the tread material.

In witness whereof, I have hereunto signed my name.

JORGEN I. HAASE.